April 27, 1948.  H. BUTLER  2,440,392

ZERO METER ADJUSTER

Filed Aug. 8, 1944

INVENTOR
HOWARD BUTLER
BY Henry J. Luecke
ATTORNEY.

Patented Apr. 27, 1948

2,440,392

UNITED STATES PATENT OFFICE 2,440,392

ZERO METER ADJUSTER

Howard Butler, Walsall, England

Application August 8, 1944, Serial No. 548,585
In Great Britain October 29, 1943

8 Claims. (Cl. 171—95)

1

This invention relates to electrical and other measuring instruments including a pointer co-operating with a scale, one of these members, usually the pointer, being pivotally mounted for oscillation and being acted upon by a spring which operates to bring the pointer back to the zero position, the arrangement being such that the spring opposes motion away from the zero position. In such instruments it is desirable that means shall be provided to allow of an adjustment of the spring so that a pointer will come to rest exactly at the zero position of the scale, and the present invention is concerned with such adjusting means.

The invention is particularly applicable to electrical measuring instruments of the kind having a base, above which is a magnet between the poles of which is mounted an actuating unit including a coil and a core, one of these members being spring-loaded and mounted for oscillation about a centre and carrying a pointer moving over a scale marked on a dial.

The present invention is particularly applicable to ammeters and volt meters and primarily intended for application to small micro ammeters intended to be used in positions where they are subject to vibrations and shocks.

Instruments of the kind referred to usually have a magnet of gapped circular form with the actuating unit mounted in the gap under and supported by a bridge carried by a plate secured to the top of the magnet, and this plate usually also carries the dial.

In many such instruments the moving member of the actuating unit is spring-loaded by means of hair springs, one disposed at each end of the unit. Further, it is common practice to provide the base member with pillars so that the assembly comprising the magnet, the actuating unit and associated parts can be mounted in spaced relationship above the base on these pillars.

Means are usually provided for adjusting one of the hair springs so as to bring the indicating arm to the zero marked on the dial when no current is flowing, such adjusting means taking the form of a member rotatably mounted in the front of the casing and having a mechanical connection within the casing for moving a pivoted arm to which one end of the hair spring is attached.

The object of the present invention is to provide improved or simplified means for mounting the adjusting device in the casing.

The invention is illustrated in the accompanying drawings, wherein—

Figure 1 is a front view of an instrument to which the invention has been applied.

2

Figures 2 to 5 are shown to a much larger scale than that of Figure 1.

Figure 1:
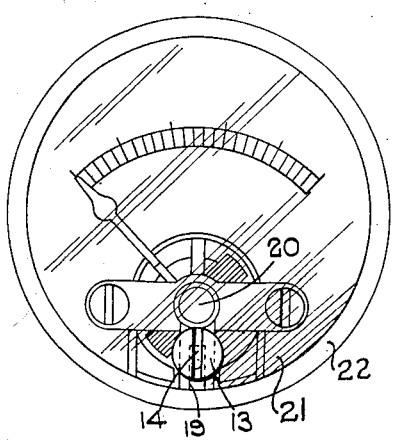
Figure 2:
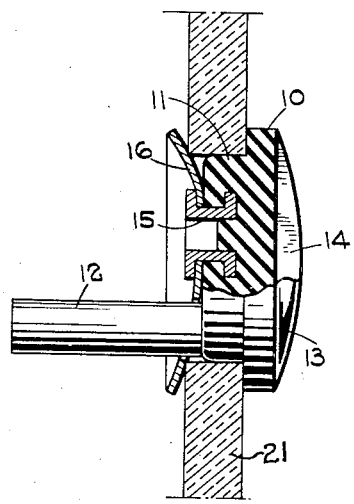
Figure 2 is a sectional view in side elevation showing one construction.
Figure 3:
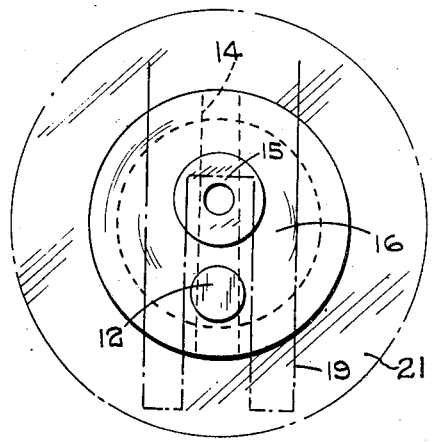
Figure 3 is a front view thereof.

In the construction illustrated in Figures 1 to 4, the hole in which the stud 10 can oscillate is in the transparent panel 21 forming the front of the instrument casing 22 and is of circular form. Alternatively, the hole may extend through both the casing 22 and the transparent panel 21 if a part of the casing extends across the surface of the panel 21.

The stud 10 is provided with a cylindrical part 11 adapted to turn in the circular hole, and from the inner end of the stud projects an arm 12 which is eccentric in relation to the axis of the stud.

The head of the stud is formed by a flange 13 which is flat on one side where it engages the face of the panel or casing, and the other side of the head is domed and provided with a screwdriver slot 14 or with a non-circular recess or with flats so that it can be turned.

The stud 10 may be made of moulded material and moulded therein is a hollow rivet 15. This rivet may be central in relation to the stud or it may be somewhat offset from the centre as shown. Mounted on this rivet is a washer 16 which is normally flat but which is distorted into part-spherical form when the end of the rivet 15 is expanded to clamp the washer to the stud. The arm 12 extends through a hole in the washer.

Figure 5:
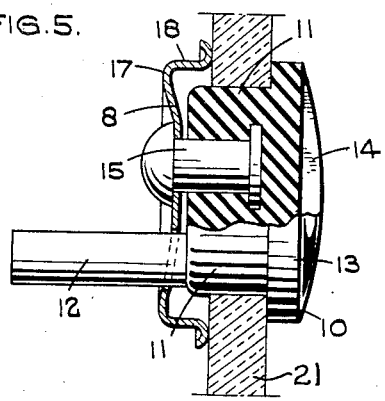
Figure 5 is a sectional view in side elevation showing another construction.
Figure 4:
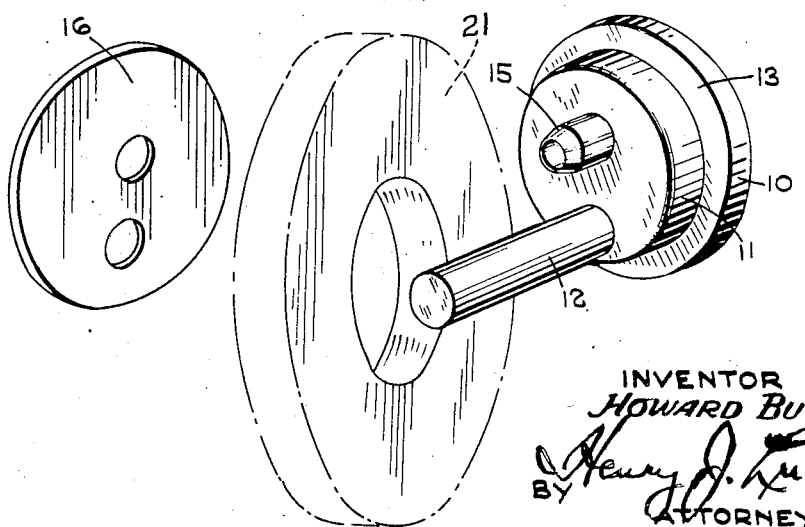
Figure 4 is a perspective view showing the parts before assembly.

In the construction shown in Figure 5, the cylindrical part 11 of the stud is of a greater length than the thickness of the transparent panel through which it extends, and in this case the rivet 15 is solid instead of being tubular although this is not essential, as a tubular rivet can equally well be employed.

In this construction the washer is shown at 17 and is of cup shape, having a cylindrical part 18, the edge of which bears on the inner surface of the transparent panel. The end 8 of the washer is originally flat but is distorted inwardly by the act of forming the head of the rivet 15 so that in both constructions the washer presses against the inner side of the transparent panel, in the one case on the edge of the hole, and in the other case against the flat surface.

In both cases the arm 12 engages in the forked end 19 of a lever which may be pivoted at the centre 20 and which is attached to the end of one of the hair springs.

Adjustment of the zero position is obtained by turning the stud 10 upon its own centre. The movement required is never more than a few degrees.

If it is desired to make the construction waterproof, grease may be used to fill the space between the inner end of the stud and the inner side of the washer.

What I claim then is:

1. A zero adjuster for a measuring instrument comprising a casing member, a stud mounted for rotation about its axis in an opening in the casing member, said stud having a flanged head engaging the outer side of the casing member, an eccentric projection on the opposite end of the stud, and a normally flat washer secured to the inner end of the stud, said washer being bent, by means securing it to the stud acting in conjunction with the edge of the opening in which the stud engages, and forming a cover for said opening.

2. A zero adjuster for a measuring instrument comprising a casing member, a stud mounted for rotation about its axis in an opening in the casing member, said stud having a flanged head engaging the outer side of the casing member, an eccentric projection on the opposite end of the stud, a rivet projecting from the inner end of the stud, a normally flat washer secured to the inner end of the stud by said rivet, said washer being bent against the inner edge of the opening in which the stud engages, and forming a cover for said opening.

3. A zero adjuster for a measuring instrument comprising a casing member, a stud mounted for rotation about its axis in an opening in the casing member, said stud having a flanged head engaging the outer side of the casing member, an eccentric projection on the opposite end of the stud, and a washer of cup form secured to the inner end of the stud, said washer having its edge portion bearing against the inner side of the casing member, and said washer having its end portion normally flat but bent towards the stud by means securing it to the stud, and forming a cover for said opening.

4. A zero adjuster for a measuring instrument comprising a casing member, a stud mounted in an opening in said casing member, a rivet therein and projecting from the end at the inner side of the casing member, said stud having a flange forming a head, one side of which engages the outer side of the casing member in which the stud is mounted, and a cylindrical part protruding into and engaging the wall of a cylindrical opening in the casing member, a resilient plate washer mounted on the projecting end of said rivet, said washer engaging the casing member at points within the inner side of the casing around the opening therein and forming a cover therefor, said washer being bent at its inner part towards the end of the stud and retained in the bent position by a head on the rivet, so that the inner end of said opening is pressure sealed by the washer and the outer end of the opening is pressure sealed by the head of the stud, and an eccentric arm on the inner end of the stud extending through an opening in said washer.

5. A zero adjuster for a measuring instrument comprising a casing member, a stud mounted in an opening in said casing member, a rivet forming an integral unit with the stud and projecting eccentrically from the end at the inner side of the casing member, said stud having a flange forming a head, one side of which engages the outer side of the casing member in which the stud is mounted and a cylindrical part protruding into and engaging the wall of a cylindrical opening in the casing member, a resilient plate washer mounted on the projecting end of said rivet, said washer engaging the casing member at points within the inner side of the casing around the opening therein and forming a cover therefor, said washer being bent at its inner part towards the end of the stud and retained in the bent position by a head on the rivet so that the inner end of said opening is pressure sealed by the washer and the outer end of the opening is pressure sealed by the head of the stud, and an eccentric arm on the inner end of the stud extending through an opening in said washer.

6. A zero adjuster for a measuring instrument comprising a casing member, a moulded stud mounted in an opening in said casing member, a rivet moulded therein and projecting from the end at the inner side of the casing member, said stud having a flange forming a head, one side of which engages the outer side of the casing member in which the stud is mounted and a cylindrical part protruding into and engaging the wall of a cylindrical opening in the casing member, said cylindrical part being shorter than the length of said opening, a resilient plate washer mounted on the projecting end of said rivet, said washer engaging the edge of the inner end of said opening, said washer being bent at its inner part towards the end of the stud and retained in the bent position by a head on the rivet so that the inner end of said opening is pressure sealed by the washer and the outer end of the opening is pressure sealed by the head of the stud and an eccentric arm on the inner end of the stud extending through an opening in said washer.

7. A zero adjuster for a measuring instrument comprising a casing member, a moulded stud mounted in an opening in said casing member, a rivet moulded therein and projecting from the end at the inner side of the casing member, said stud having a flange forming a head one side of which engages the outer side of the casing member in which the stud is mounted and a cylindrical part protruding into and engaging the wall of a cylindrical opening in the casing member, said cylindrical part being longer than the length of said opening, a resilient plate washer mounted on the projecting end of said rivet, said washer engaging the inner side of the casing member around the opening therein and forming a cover therefor, said washer being bent at its inner part towards the end of the stud and retained in the bent position by a head on the rivet, said washer having a cylindrical peripheral part bearing against the inner surface of the casing member around the opening therein so that the inner end of said opening is pressure sealed by the washer and the outer end of the opening is pressure sealed by the head of the stud, and an eccentric arm on the inner end of the stud extending through an opening in said washer.

8. A zero adjuster for a measuring instrument comprising a casing member, a stud mounted for rotation about its axis in an opening in the casing member, said stud having a flanged head engaging the outer side of the casing member, an eccentric projection on the opposite end of the stud, and a resilient plate washer secured to the inner end of the stud, said washer being bent by means securing it to the stud and engaging the casing member at points within the inner side of the casing member around the opening therein and forming a cover therefor.

HOWARD BUTLER.

REFERENCES CITED

The following references are of record in the file of this patent:

UNITED STATES PATENTS

| Number | Name | Date |
|---|---|---|
| 1,229,767 | MacGehan | June 12, 1917 |
| 1,501,698 | Beckert | July 15, 1924 |
| 2,231,609 | Anderson | Feb. 11, 1941 |